United States Patent
Allen

(10) Patent No.: US 12,430,539 B2
(45) Date of Patent: Sep. 30, 2025

(54) SYSTEM AND METHOD FOR ADAPTIVE OPTIMIZATION

(71) Applicant: Incucomm, Inc., Addison, TX (US)

(72) Inventor: Randal Allen, Orlando, FL (US)

(73) Assignee: INCUCOMM, INC., Addison, TX (US)

(*) Notice: Subject to any disclaimer, the term of this patent is extended or adjusted under 35 U.S.C. 154(b) by 0 days.

(21) Appl. No.: 18/050,661

(22) Filed: Oct. 28, 2022

(65) Prior Publication Data
US 2023/0289562 A1 Sep. 14, 2023

Related U.S. Application Data

(63) Continuation of application No. 16/674,885, filed on Nov. 5, 2019, now abandoned.
(Continued)

(51) Int. Cl.
*G06N 3/045* (2023.01)
*G06F 7/22* (2006.01)
(Continued)

(52) U.S. Cl.
CPC ............... *G06N 3/045* (2023.01); *G06F 7/22* (2013.01); *G06F 11/3452* (2013.01); *G06F 17/11* (2013.01); *G06F 17/16* (2013.01); *G06F 17/18* (2013.01); *G06F 30/27* (2020.01); *G06N 3/08* (2013.01); *G06N 7/01* (2023.01);
(Continued)

(58) Field of Classification Search
CPC .... G06F 11/3452; G06F 17/11; G06F 17/142; G06F 17/16; G06F 17/18; G06F 2111/10; G06F 2207/4824; G06F 30/27; G06F 7/023; G06F 7/22; G06N 20/00; G06N 3/042; G06N 3/045; G06N 3/048; G06N 3/08; G06N 3/084; G06N 3/105; G06N 5/01; G06N 7/01
See application file for complete search history.

(56) References Cited

U.S. PATENT DOCUMENTS

| | | | |
|---|---|---|---|
| 4,873,661 A | 10/1989 | Tsividis | |
| 4,972,363 A | 11/1990 | Nguyen et al. | |

(Continued)

FOREIGN PATENT DOCUMENTS

CN 107818365 A * 3/2018

*Primary Examiner* — Yoshihisa Ishizuka
(74) *Attorney, Agent, or Firm* — Boisbrun Hofman, PLLC

(57) ABSTRACT

Systems and methods for adaptively optimizing a performance function for operating a system. A performance function for a system is adaptively optimized, and utilized for the operation of the system, by selecting a first value for a first independent variable that determines an operating state of the system described by a performance function; establishing a first range of values for the first independent variable; selecting a first number of values in the first range of values to test the first independent variable; selecting first random values within the first range of values for the first independent variable based on the first number of values; evaluating the performance function at the first random values; optimizing the performance function by selecting the first value of the first independent variable from the first random values that provides a first extremum value for the performance function.

20 Claims, 14 Drawing Sheets

Related U.S. Application Data

(60) Provisional application No. 62/756,044, filed on Nov. 5, 2018.

(51) Int. Cl.

| | | |
|---|---|---|
| *G06F 11/34* | (2006.01) | |
| *G06F 17/11* | (2006.01) | |
| *G06F 17/14* | (2006.01) | |
| *G06F 17/16* | (2006.01) | |
| *G06F 17/18* | (2006.01) | |
| *G06F 30/27* | (2020.01) | |
| *G06F 111/10* | (2020.01) | |
| *G06N 3/08* | (2023.01) | |
| *G06N 7/01* | (2023.01) | |
| *G06N 20/00* | (2019.01) | |

(52) U.S. Cl.
CPC ........... *G06N 20/00* (2019.01); *G06F 17/142* (2013.01); *G06F 2111/10* (2020.01)

(56) References Cited

U.S. PATENT DOCUMENTS

| | | | |
|---|---|---|---|
| 5,087,826 A | 2/1992 | Holler et al. | |
| 5,095,443 A | 3/1992 | Watanabe | |
| 7,184,992 B1 | 2/2007 | Polyak et al. | |
| 8,024,682 B2 | 9/2011 | McConaghy et al. | |
| 8,670,960 B2 | 3/2014 | Couet et al. | |
| 9,015,083 B1 | 4/2015 | Monga et al. | |
| 9,152,611 B2 | 10/2015 | Chiang et al. | |
| 9,355,067 B1 | 5/2016 | Monga et al. | |
| 9,576,031 B1 | 2/2017 | Aggarwal et al. | |
| 9,645,575 B2 | 5/2017 | Watson | |
| 9,659,253 B1 | 5/2017 | Ghaddar et al. | |
| 9,864,731 B2 | 1/2018 | Baran et al. | |
| 10,068,170 B2 | 9/2018 | Golovashkin et al. | |
| 10,300,603 B2 | 5/2019 | Gorshechnikov et al. | |
| 10,430,531 B2 | 10/2019 | Hayie | |
| 10,795,337 B2 | 10/2020 | Bowers et al. | |
| 2005/0171746 A1 | 8/2005 | Thalhammer-Reyero | |
| 2012/0143575 A1* | 6/2012 | Imhof | G01V 11/00 703/2 |
| 2014/0330749 A1 | 11/2014 | Candas et al. | |
| 2015/0039663 A1 | 2/2015 | Chiang et al. | |
| 2015/0040107 A1* | 2/2015 | Iyer | G06F 30/327 717/131 |
| 2015/0347648 A1 | 12/2015 | Katrasnik | |
| 2016/0034820 A1 | 2/2016 | Baran et al. | |
| 2016/0147712 A1 | 5/2016 | Chiang et al. | |
| 2016/0203419 A1 | 7/2016 | Chiang et al. | |
| 2017/0102694 A1 | 4/2017 | Enver et al. | |
| 2017/0199845 A1* | 7/2017 | Azar | G06F 17/11 |
| 2017/0285123 A1 | 10/2017 | Kaditz et al. | |
| 2018/0084073 A1 | 3/2018 | Walsh et al. | |
| 2018/0101766 A1 | 4/2018 | He et al. | |
| 2018/0181540 A1 | 6/2018 | Baran et al. | |
| 2018/0204111 A1* | 7/2018 | Zadeh | G06V 10/764 |
| 2018/0275281 A1 | 9/2018 | Liu et al. | |
| 2018/0285787 A1 | 10/2018 | Ito et al. | |
| 2019/0036639 A1 | 1/2019 | Huang et al. | |
| 2019/0243933 A1 | 8/2019 | Roemerman et al. | |
| 2020/0192777 A1 | 6/2020 | Allen | |
| 2020/0364387 A1 | 11/2020 | Roemerman et al. | |
| 2021/0109496 A1 | 4/2021 | Bowers et al. | |

\* cited by examiner

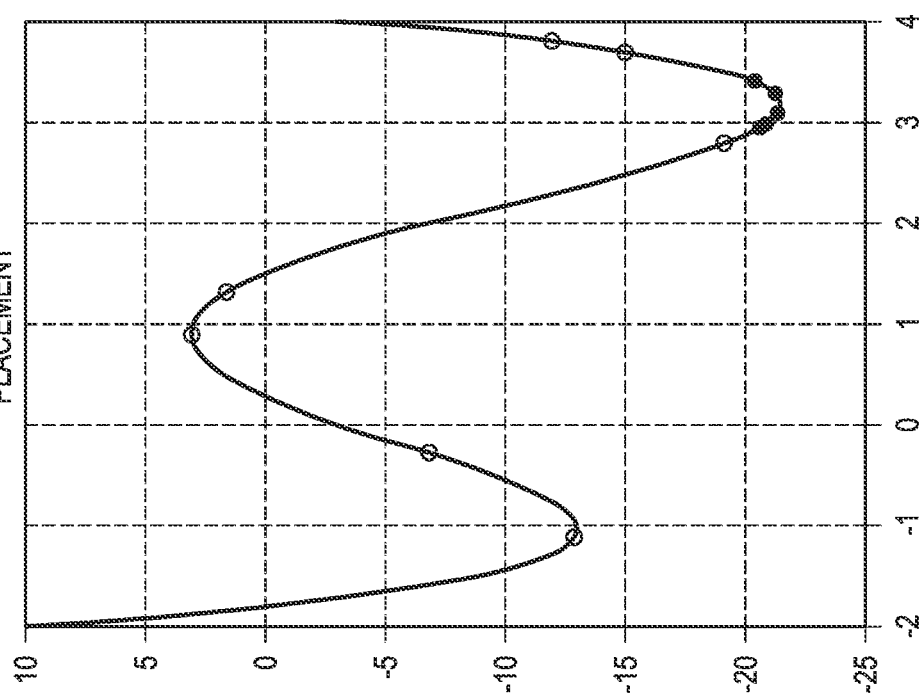
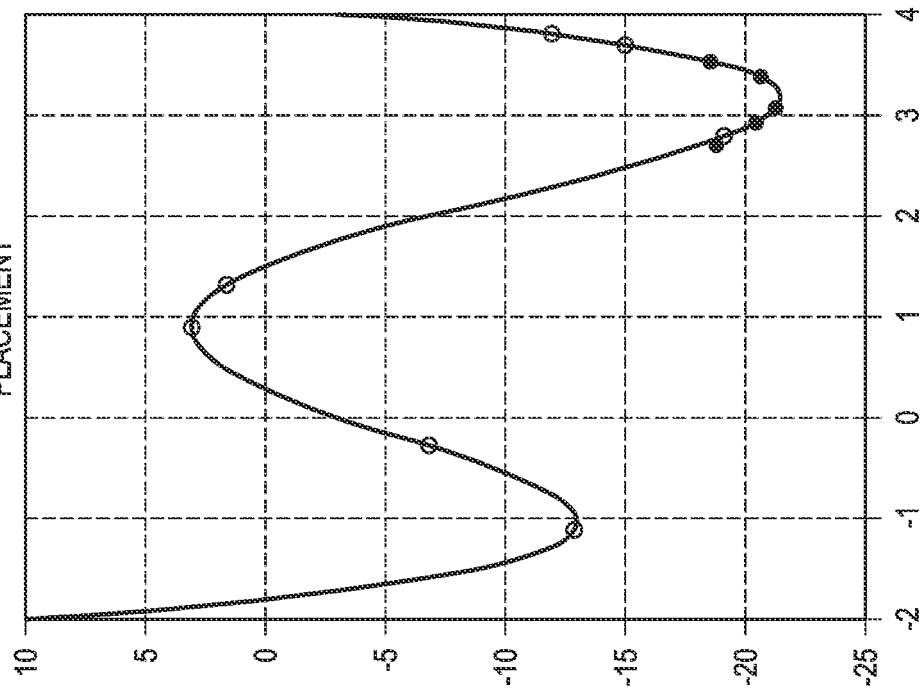

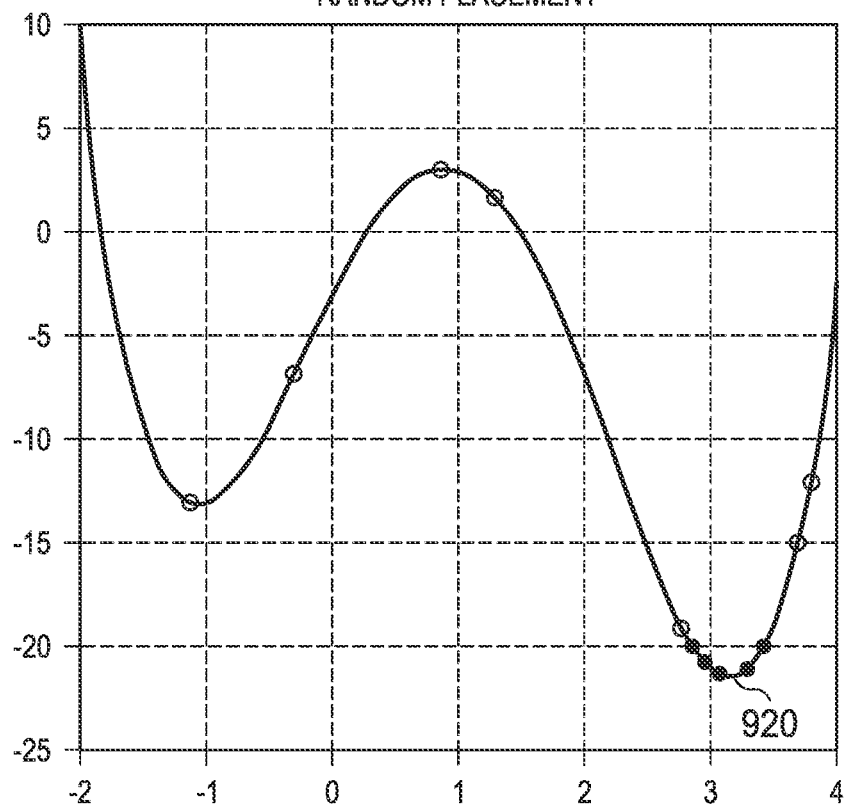

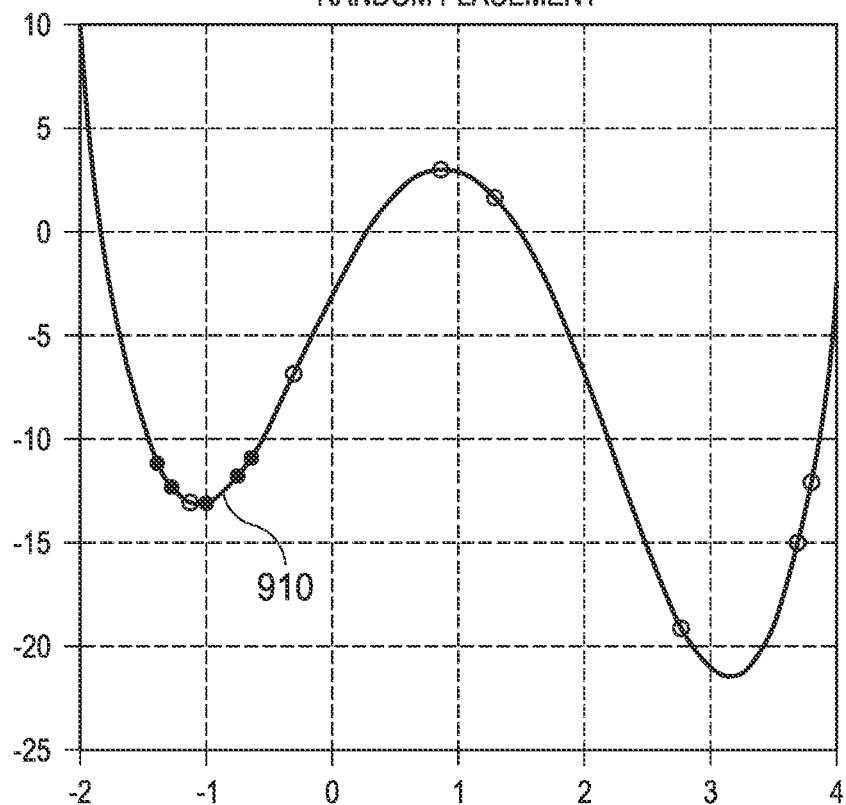

SYSTEM AND METHOD FOR ADAPTIVE OPTIMIZATION

CROSS-REFERENCE TO RELATED APPLICATIONS

This application is a continuation of U.S. patent application Ser. No. 16/674,885, entitled "SYSTEM AND METHOD FOR ADAPTIVE OPTIMIZATION", filed on Nov. 5, 2019, which claims the benefit of U.S. Provisional Patent Application No. 62/756,044, entitled "HYBRID AI," filed Nov. 5, 2018, each of which are incorporated herein by reference.

This application is related to U.S. application Ser. No. 15/611,476 entitled "PREDICTIVE AND PRESCRIPTIVE ANALYTICS FOR SYSTEMS UNDER VARIABLE OPERATIONS," filed Jun. 1, 2017, which is incorporated herein by reference.

This application is related to U.S. Provisional Application No. 62/627,644 entitled "DIGITAL TWINS, PAIRS, AND PLURALITIES," filed Feb. 7, 2018, converted to U.S. application Ser. No. 16/270,338 entitled "SYSTEM AND METHOD THAT CHARACTERIZES AN OBJECT EMPLOYING VIRTUAL REPRESENTATIONS THEREOF," filed Feb. 7, 2019, which are incorporated herein by reference.

This application is related to U.S. application Ser. No. 16/574,848, entitled "SYSTEM AND METHOD FOR STATE ESTIMATION IN A NOISY MACHINE-LEARNING ENVIRONMENT," filed Nov. 5, 2019, U.S. application Ser. No. 16/674,942, entitled "SYSTEM AND METHOD FOR CONSTRUCTING A MATHEMATICAL MODEL OF A SYSTEM IN AN ARTIFICIAL INTELLIGENCE ENVIRONMENT," filed Nov. 5, 2019, and U.S. application Ser. No. 16/675,000, entitled "SYSTEM AND METHOD FOR VIGOROUS ARTIFICIAL INTELLIGENCE," filed Nov. 5, 2019, which are incorporated herein by reference.

RELATED REFERENCES

Each of the references cited below are incorporated herein by reference.

U.S. Patents

| Patent Number | Issue Date | Patentee |
| --- | --- | --- |
| 10,068,170 | Sep. 4, 2018 | Golovashkin, et al. |
| 9,864,731 | Jan. 9, 2018 | Baran, et al. |
| 9,659,253 | May 23, 2017 | Ghaddar, et al. |
| 9,355,067 | May 31, 2016 | Monga, et al. |
| 9,152,611 | Oct. 6, 2015 | Chiang, et al. |
| 9,015,083 | Apr. 21, 2015 | Monga, et al. |
| 8,670,960 | Mar. 11, 2014 | Couet, et al. |
| 8,024,682 | Sep. 20, 2011 | McConaghy, et al. |
| 7,184,992 | Feb. 27, 2007 | Polyak, et al. |

U.S. Patent Application Publications

| Publication Number | Kind Code | Publication Date | Applicant |
| --- | --- | --- | --- |
| 20190036639 | A1 | Jan. 31, 2019 | Huang; Yan; et al. |
| 20180285787 | A1 | Oct. 4, 2018 | Ito; Shinji; et al. |
| 20180275281 (ALAG) | A1 | Sep. 27, 2018 | Liu; Daniel N.; et al. |
| 20180181540 | A1 | Jun. 28, 2018 | Baran; Thomas A.; et al. |
| 20180101766 | A1 | Apr. 12, 2018 | He; Xi; et al. |
| 20160203419 (PSO) | A1 | Jul. 14, 2016 | Chiang; Hsiao-Dong; et al. |
| 20160147712 | A1 | May 26, 2016 | Chiang; Hsiao-Dong; et al. |
| 20160034820 | A1 | Feb. 4, 2016 | Baran; Thomas A.; et al. |
| 20150039663 | A1 | Feb. 5, 2015 | Chiang; Hsiao-Dong; et al. |

Nonpatent Publications

Jain, P. and Kar, P., "Non-Convex Optimization for Machine Learning" (2017)

Mermin, N. D., "Quantum Computer Science, An Introduction" (2007)

Bazaraa, M., et al., "Nonlinear Programming: Theory and Algorithms" (2006)

Hillier, F. S. and Lieberman, G. J., "Introduction to Operations Research" (2005)

Hillier, F. S. and Hillier, M. S., "Introduction to Management Science" (2003)

Fouskakis, D., and Draper, D., "Stochastic Optimization: A Review" (2001)

Kolman, B., and Beck, R. E., "Elementary Linear Programming with Applications" (1980)

TECHNICAL FIELD

The present disclosure is directed to a system and method for adaptive optimization of an operating state of a system.

BACKGROUND

Perhaps the seminal optimization problem is rooted in the method of least squares, credited to Gauss in the late $18^{th}$ century and published by Legendre in the early $19^{th}$ century. This problem seeks to minimize the sum of the squares of the residual error between a set of observed data and a line fitted to them.

In the $20^{th}$ century, methods have been developed to solve problems applicable to operations research and management sciences including game theory, decision analysis, queueing theory, inventory theory, transportation, and networking. These problems are predominantly concerned with seeking the unique extremum of systems which exists due to what is known as convexity. FIG. 1 shows an example of a convex function where there is a unique extremum, in this case a minimum, at the origin [(0, 0) on interval (−2, 4)]. Systems architectures based on convex optimization are reliable when certain conditions are met. The full set of requirements are known to those skilled in the art. Optimization of convex systems is not difficult when using modern computing equipment. In fact, linear optimization was used in the 1940's before general purpose digital computers existed. Today, digital systems optimize these relatively simple problems easily.

However, most useful systems are not linear and not convex. FIG. 2 shows an example of a nonconvex function which has several extrema [(−1.1, −13.1), (0.9, 3.1), and (3.2, −21.6) on the interval (−2, 4)]. In addition to multiple extrema, nonconvex functions pose other challenges including varying curvature, flat regions, deep wells, and saddle points when the curve becomes a higher dimensional surface. Theoretical solutions for these problems do not exist and weak guarantees are based on application-dependent approximations. Furthermore, there are no recipes for parameter selection associated with any solution.

Thus, difficulty in optimizing nonconvex systems is an important topic for many practical applications, processes, and systems. Aircraft and spacecraft optimal control, milling machine optimal cutting speed, automated bidding systems, and complex artificial neural networks associated with deep learning are examples of the diversity of modern nonlinear and nonconvex systems.

Upon surveying the prior art, those skilled in the art will recognize the disadvantages of current methods. To expedite the survey, FIG. 3 and FIG. 4 show block diagrams of unconstrained and constrained problems and solution methods, while FIG. 5 shows a diagram some of the more popular multivariate numerical methods. In short, the current disadvantages are numerical issues associated with (partial) derivatives for gradient-based methods. Keen insight is needed for the selection of a starting point for function evaluation methods. A priori problem structure knowledge is preferable for algorithm choice and for parameter selection, including independent variables for nonconvex methods. Premature termination of an algorithm can occur when a local extremum is found.

A process to solve the most-general nonconvex optimization problem should be gradient-free, should not require a priori problem structure knowledge for selecting a starting point or other parameters, and should increase confidence of locating global extrema. Accordingly, what is needed in the art is a system and method for overcoming optimization challenges in, for instance, a nonconvex, non-differentiable, optimization environment.

SUMMARY

These and other problems are generally solved or circumvented, and technical advantages are generally achieved, by advantageous embodiments of the present disclosure for systems and methods for adaptively optimizing a performance function for operating a system. A performance function for a system is adaptively optimized, and utilized for the operation of the system, by selecting a first value for a first independent variable that determines an operating state of the system described by a performance function; establishing a first range of values for the first independent variable; selecting a first number of values in the first range of values to test the first independent variable; selecting first random values within the first range of values for the first independent variable based on the first number of values; evaluating the performance function at the first random values; optimizing the performance function by selecting the first value of the first independent variable from the first random values that provides a first extremum value for the performance function.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, reference is now made to the following descriptions taken in conjunction with the accompanying drawings, in which:

FIGS. 8A, 8B, 8C and 8D illustrate grids demonstrating adaptive placement of independent variables;

FIGS. 9A and 9B illustrate grids of an example of global and local outcomes from Monte Carlo analysis;

Corresponding numerals and symbols in the different figures generally refer to corresponding parts unless otherwise indicated, and may not be redescribed in the interest of brevity after the first instance. The FIGS. are drawn to illustrate the relevant aspects of exemplary embodiments.

DETAILED DESCRIPTION

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules for optimizing an operating state of a system described by a performance function. While the principles will be described in the environment of a system described by a performance function, any environment such as a system described by a multidimensional performance function is well within the broad scope of the present disclosure.

Due to inherent nonlinearity and nonconvexity of many important systems, such as the complex artificial neural networks of deep learning, a system is needed which addresses the disadvantages of current methods. To avoid numerical issues associated with gradient-based methods, a gradient-free method is desired. Furthermore, since artificial decision-making network topologies may include non-differentiable logic gates, with implications for quantum computing, gradient-based methods will not suffice for many systems applications.

The system introduced herein leverages the benefits of both grid search and random search where their combination alleviates their corresponding limitations. As an example, the system no longer requires an explicit starting point, but implicitly deploys a plurality of starting points. Because the system is constructed to solve the most general nonconvex optimization problem, this breakthrough approach does not require a priori knowledge of the problem structure nor require tuning of parameters.

If the problem happens to be well-behaved, meaning the nonconvexity contains relatively few extrema, the likelihood of locating the global extremum is high. However, in the case if high nonconvexity, with many extrema, the system may employ Monte Carlo methods to provide additional outcomes. By collecting the results over many iterations, the outcomes may be sorted to observe the extremum among other extrema. One immediate benefit is the system provides all the results which may be evaluated for cost/benefit analysis. For example, a suboptimal result may be selected due to budgetary restrictions. Another immediate benefit is the system provides the probability associated with the aggregate outcomes. Knowing the probability of occurrence associated with local extrema and the global extremum supports trust in artificial intelligence application.

Figure 1:
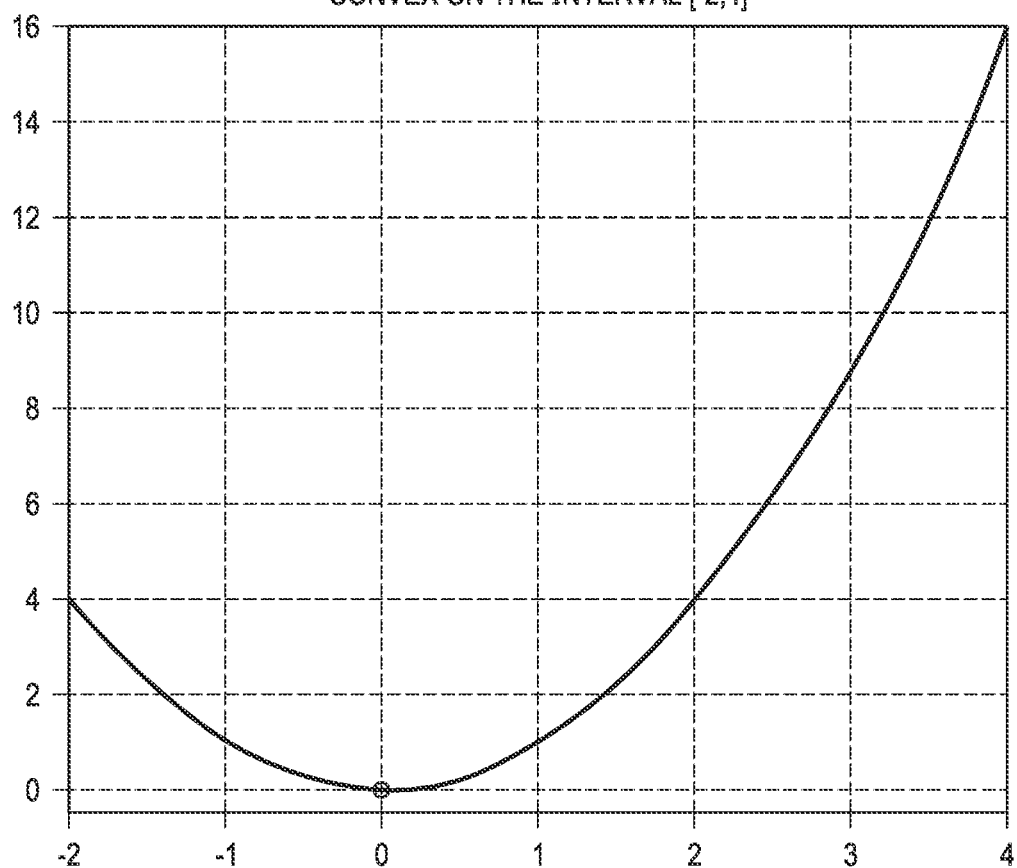
FIG. 1 illustrates a plot of a convex function with a unique extremum.
Figure 2:
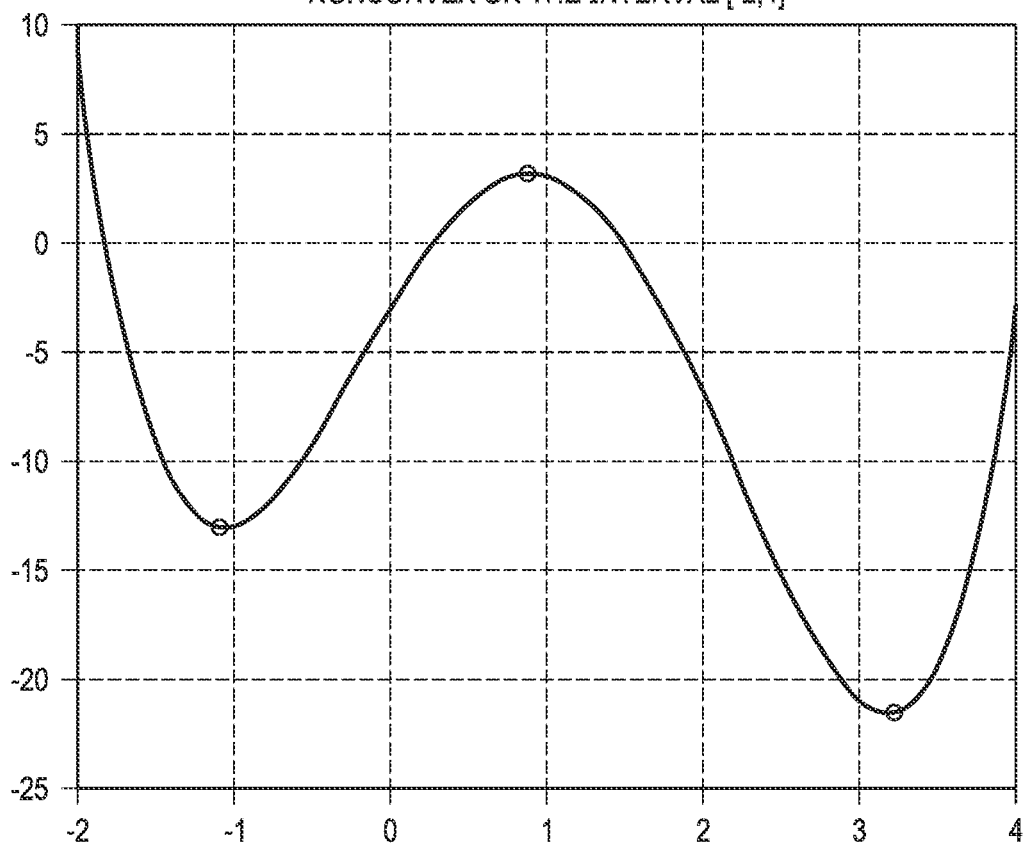
FIG. 2 illustrates a plot of a nonconvex function with multiple extrema.
Figure 3:
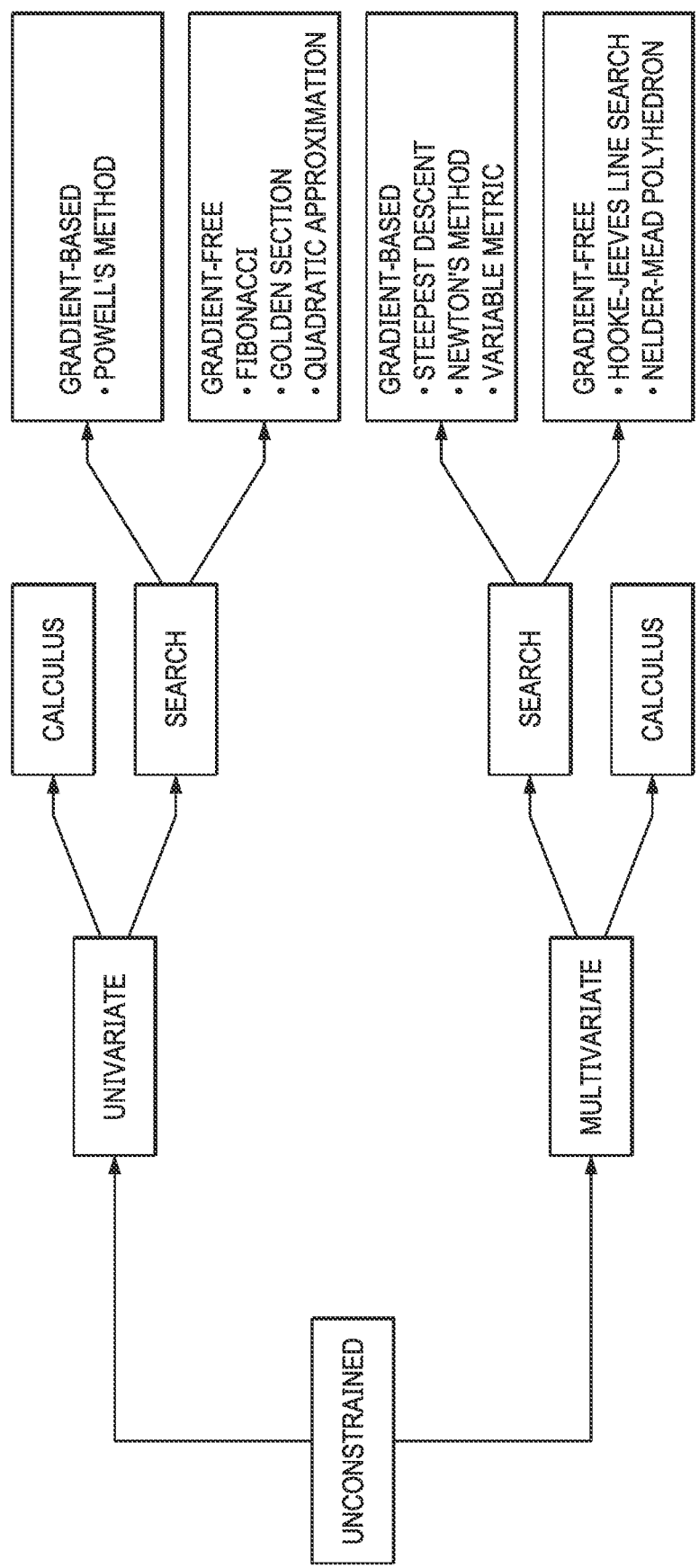
FIG. 3 illustrates a block diagram of solution methods for unconstrained optimization problems and corresponding solution methods.
Figure 4:
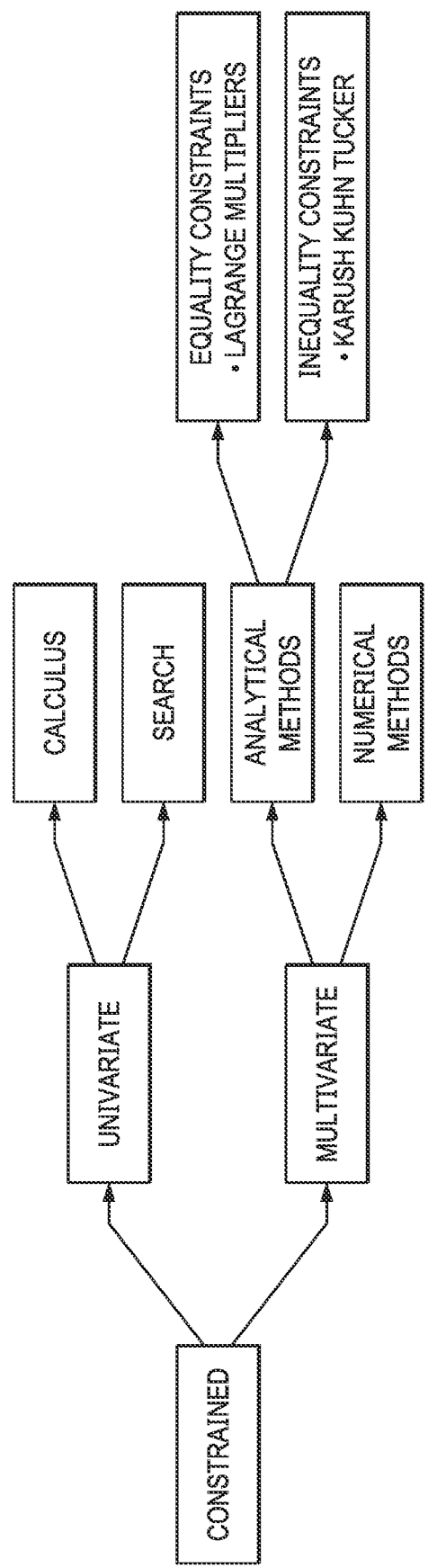
FIG. 4 illustrates a block diagram of solution methods for constrained optimization problems and corresponding solution methods.
Figure 5:
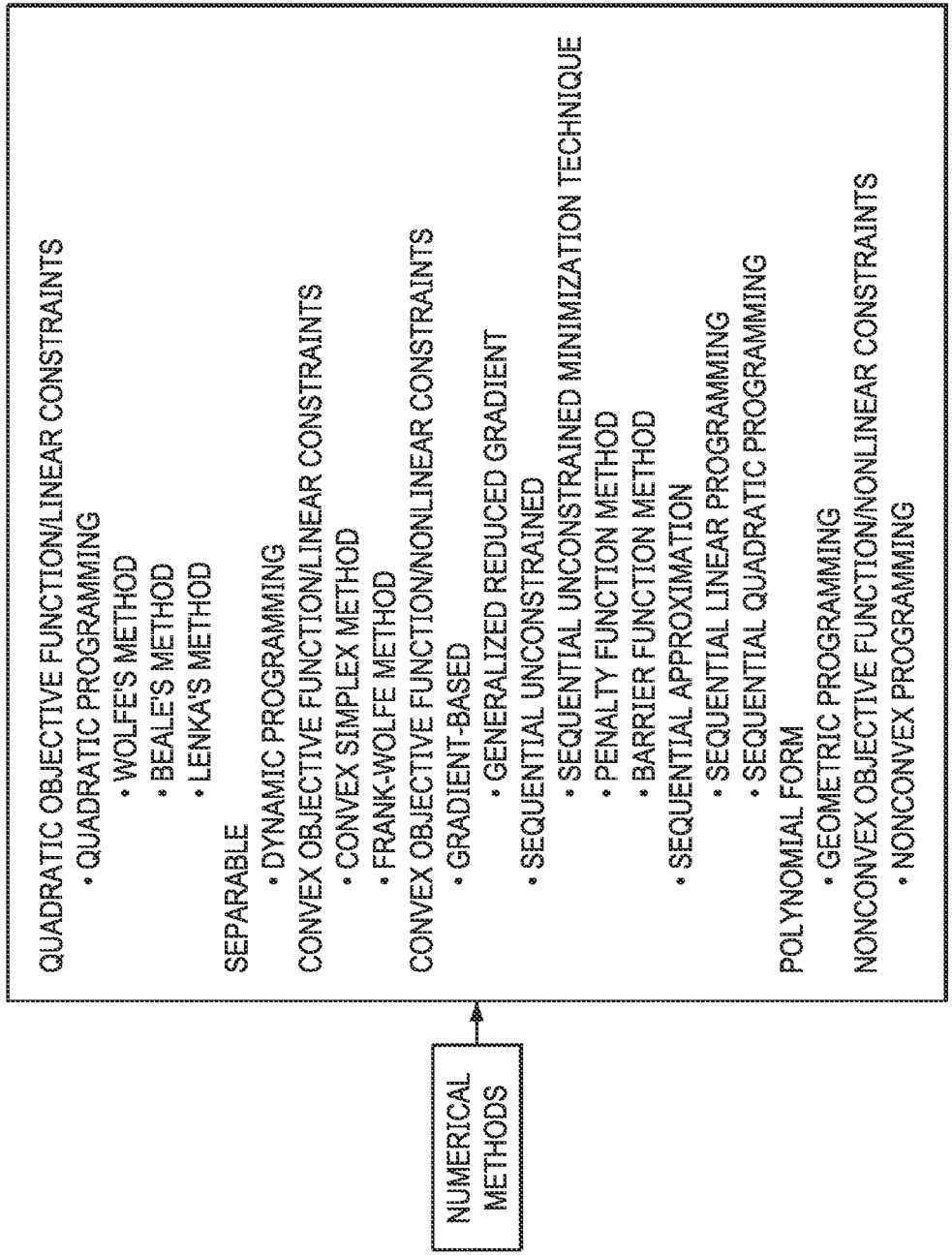
FIG. 5 illustrates a diagram of numerical methods for multivariate constrained optimization problems and multivariate numerical methods.
Figure 6:
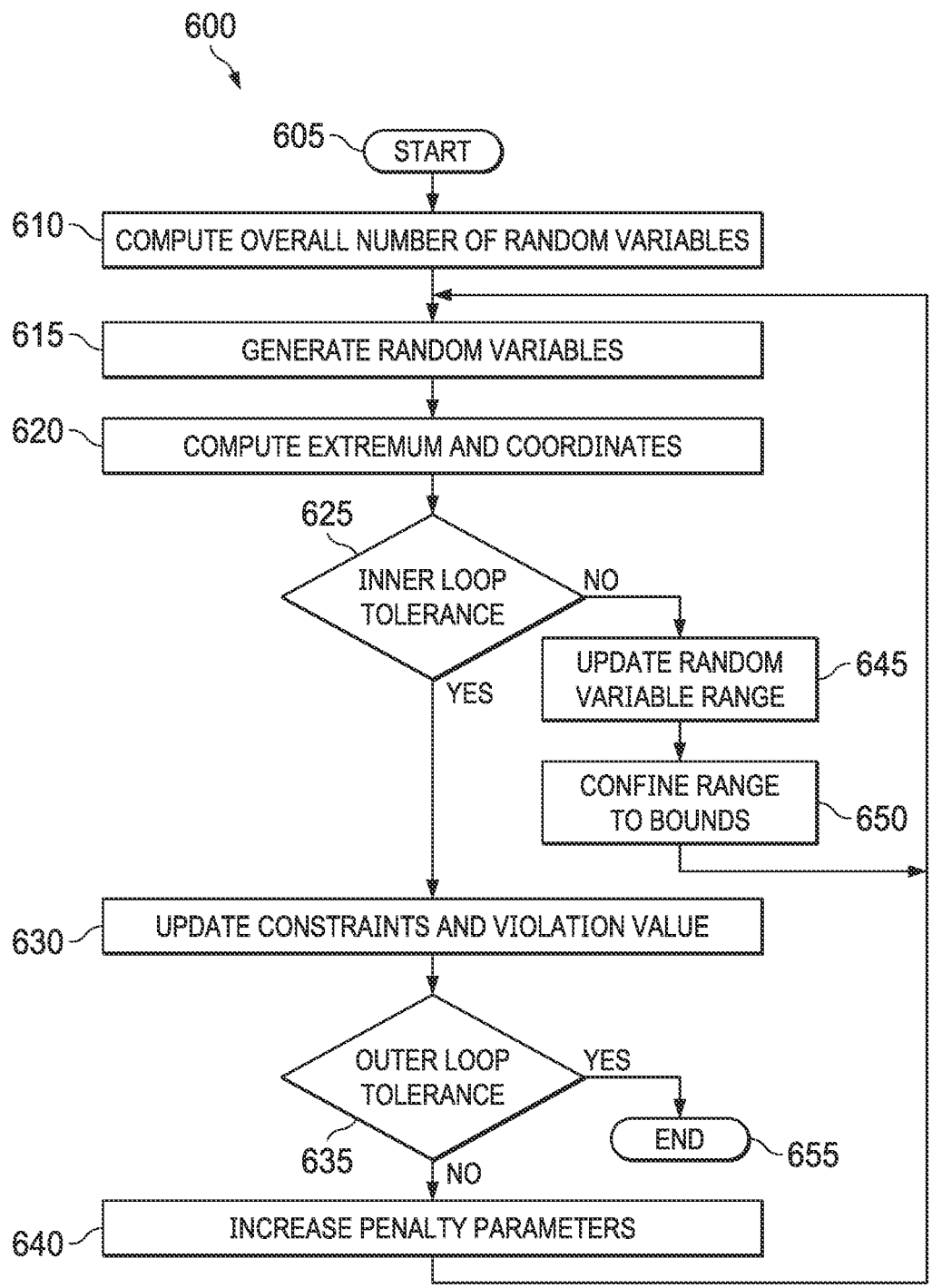
FIG. 6 illustrates a flow diagram of an embodiment of a method of selecting a value for an independent variable that determines an operating state of a system described by a performance function.

Turning now to FIG. 6, illustrated is a flow diagram of an embodiment of a method 600 of selecting a value for an independent variable that determines an operating state of a system described by a performance function. The method 600 begins at a start step or module 605 and then proceeds to compute an overall number of random variables at a step or module 610. At a step or module 615, the method 600 generates random variables that leads to an extremum computation and its corresponding coordinates at a step or module 620. At a decisional step or module 625, the inner loop tolerance is checked. If the inner loop tolerance condition is not met, the range of random variables is updated at a step or module 645, making sure, at a step or module 650 that they lie within their original bounds. The method 600 then returns to the step or module 615 to generate new random variables over, for instance, a narrowed range, thus restarting the generation process.

If the inner loop tolerance condition is met as determined in the step or module 625, constraints and the violation value are checked in a step or module 630 and updated, and the outer loop tolerance is then checked at a decisional step or module 635. If the outer loop tolerance condition is not met, penalty parameters are increased at a step or module 640, and the method 600 then returns to the step or module 615 to generate new random variables. If the outer loop tolerance condition is met as determined in the step or module 635, the method 600 ends at an end step or module 655. The method 600 may employ Monte Carlo analysis methods to collect information for further analysis.

One skilled in the art will understand optimization problems are often framed within the context of a minimization problem, recognizing a maximization problem is simply the negative of a minimization problem. Additionally, one skilled in the art will know that equality constraints are often set equal to zero and all inequality constraints will be set less than zero.

The mathematical models of optimization include independent variables, constraints, and an objective function. Independent variables describe an allocation of resources represented by the model. For example, the number of hours to operate a machine. The system operates to find optimal values of these unknowns. Constraints impose limits on the values the independent variables can assume. For example, the output of a machine cannot be negative. The objective function is a measurement based on the independent variables. The system determines the independent variables such that the objective function is enhances and potentially optimized. For example, the cost of operating the machine may be minimized or the output of the machine may be maximized.

Figure 7:
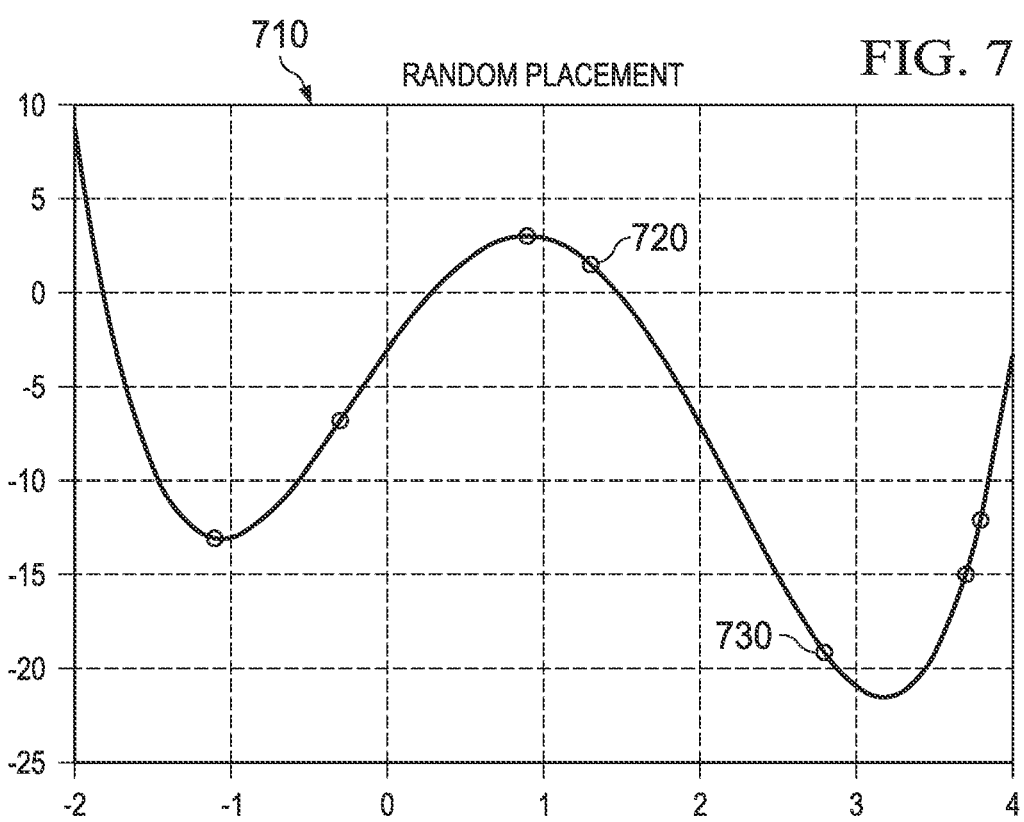
FIG. 7 illustrates a grid showing random placement of independent variables across the grid.

The system identifies the objective function (f), the inequality (g) and/or equality (h) constraints, and the lower and upper bounds for each independent variable (x). Furthermore, the system employs the convergence tolerance that impacts the precision of the result and defines the resolution of the random grid. Specifying the tolerance determines the number of decimal places for convergence. For example, if the problem is related to the financial world, a tolerance of 0.01 may be specified, meaning the solution should converge to the nearest cent. The sensitivity of each independent variable on the objective function plays a role in the selection of the resolution. While the resolution defines the number of independent variables to be placed across the hyperparameter grid 710, the independent variables (e.g., 720, 730) are placed on this grid in a random fashion, as shown in FIG. 7.

Referring again to the flowchart of FIG. 6, the overall number of random variables may be computed (the step or module 610) by subtracting the lower bound from the upper bound (for each independent variable) and dividing the difference by the resolution. The maximum from this set of results is the overall number of random variables used by the system. Next, random variables are generated (the step or module 615) for each independent variable based on their lower bound (LB) and upper bound (UB). The inequality constraints (g) and equality constraints (h) are computed, appended to the objective function, and evaluated (the step or module 620). This is done for each of the overall number of random variables.

There are several system implementations that can append the constraints to the objective function. One embodiment is through the exact multiplier penalty function. As an aside, the method of multipliers is used with (i) Newton's method if the Hessian (a matrix of partial derivatives) is available, (ii) a quasi-Newton method if only gradients (derivatives) are available, or (iii) the conjugate gradient method. This system and method as described herein combines the method of multipliers with the benefits of the grid search and random search avoiding the numerical difficulties associated with derivatives. The initial optimal Lagrange multiplier (U) is updated from its negligibly small, but nonzero initial value, $U=U+\max(2\mu g, -U)$, where $\mu$ is a constraint penalty parameter. Then, four terms are computed which will be subsequently appended to the objective function. The first term is $\mu(\max(g+U/2\mu, 0))^2$. The second term is $U^2/4\mu$. The third term is $vh$, where $v$ is another penalty parameter. The fourth term is $\mu h^2$. The terms are appended to the objective function as follows, calling special attention to the minus sign on the second term.

$$f + \mu(\max(g + U/2\mu, 0))^2 - \frac{U^2}{4\mu} + vh + \mu h^2$$

Note: µ is updated through multiplication, therefore select its initial value to be 1; whereas v is updated through addition, so its initial value is set to 0.

Returning to the set of repeated evaluations, the minimum and its corresponding set of independent variables are saved. The current minimum value is compared with the previous minimum value. For the first comparison, the initial minimum value is large by design. Since the difference between the initially large minimum value and the current minimum value is large, the small tolerance is certainly exceeded. Therefore, a second iteration is needed. This is the "Inner Loop Tolerance" decision step or module 625 in shown in FIG. 6.

Figure 8B:
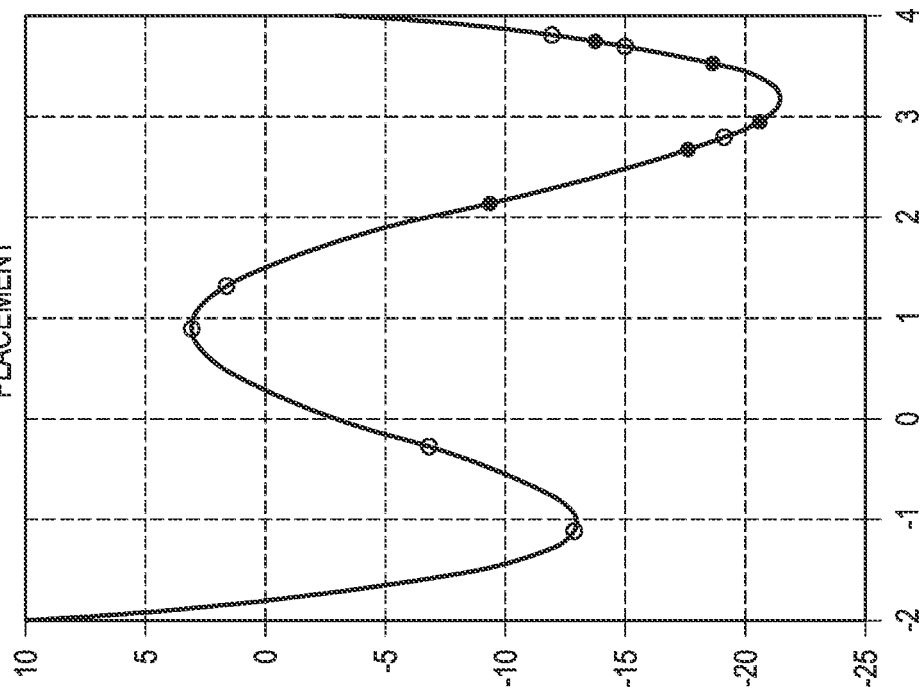
Figure 8A:
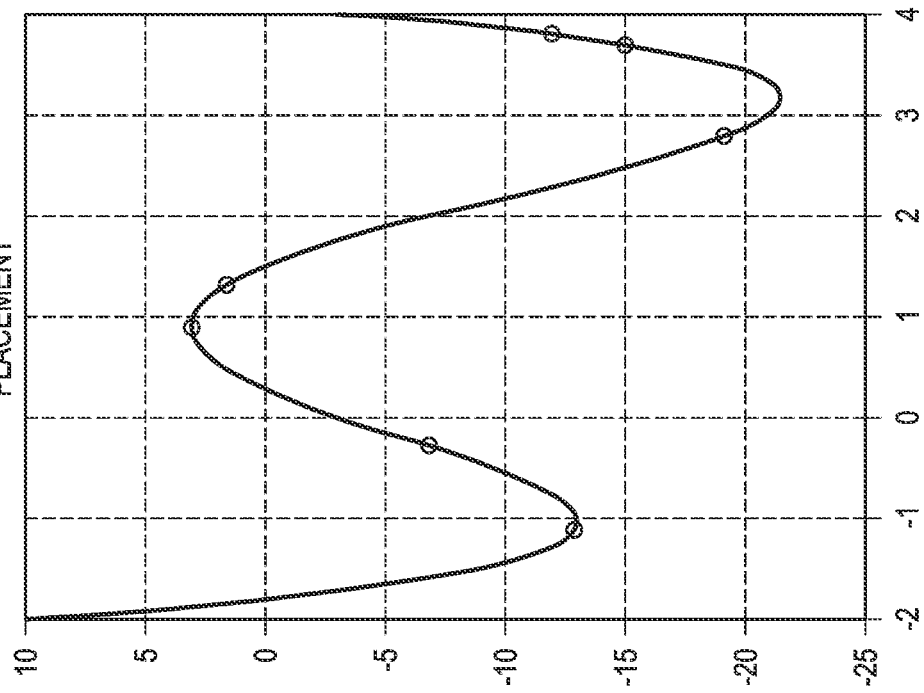

If the inner loop tolerance decision is not satisfied, a new range of random variables (the step or module 645) is centered, for instance, on the current minimum, based on current coordinates and resolution, LB=x−resolution and UB=x+resolution. Since this new range is centered on the location of the current minimum, and since the current minimum could lie near the lower bound or upper bound, the range is checked (the step or module 650) to be sure it lies above the initial lower or bound or below the initial upper bound. If it does not, the new bound (lower or upper) is reset to the initial bound value (lower or upper). This iterative approach adaptively produces a finer search for a minimum within tolerance. FIGS. 8A, 8B, 8C and 8D show an example of how this iterative approach adapts to produce a finer search, for instance, as indicated by random selection of the independent variables in the FIGS. 8B and 8C. At this point, a set of new random variables are generated for each independent variable, based on their new lower and upper bounds, and the process is restarted. A still finer selection of independent variables is indicated in FIG. 8D.

If, however, the inner loop tolerance decision is satisfied, the constraints are updated with the coordinates corresponding to the current minimum (the step or module 630). Furthermore, the constraint violation value is updated, which is simply the maximum of the absolute value of all equality constraints, max(abs(h)). The constraint violation value is compared with the outer loop tolerance. This is the "Outer Loop Tolerance" decision step or module 635 is shown in FIG. 6.

If the outer loop tolerance decision is not satisfied, either (1) increase the penalty parameter (µ=10µ) or (2) increase the penalty parameter (v=v+2µh) and increase the optimal Lagrange multiplier (U=U+max(2µg, —U)) (the step or module 640). The either/or choice is determined by comparing the constraint violation value with an initial large comparison value. If the constraint violation value exceeds the initial large comparison value, choose option (1), otherwise, select option (2). If option (2) is selected, the initial large comparison value is updated by setting it to the current constraint violation value for the next iteration. After selection of (1) or (2), a set of new random variables are generated for each independent variable (the step or module 615), and the process is restarted. If, however, the outer loop tolerance decision is satisfied, the process ends (the step or module 655), thus obtaining one solution from the system.

Finally, the system may employ Monte Carlo methods which may provide additional outcomes. By collecting the results over many iterations, possible outcomes may be sorted to observe the extremum among other extrema. FIGS. 9A and 9B show an example of two possible outcomes, one outcome produces a local minimum 910 (FIG. 9B) and the other outcome produces the global minimum 920 (FIG. 9A). Given the random placement of random independent variables across the grids of FIGS. 9A and 9B, it is unlikely that the system would terminate on the local minimum. Although unlikely, the probability of the system terminating at the local minimum is not zero. Therefore, the data may be examined to inspect the statistics associated with the possible outcomes.

Figure 10:
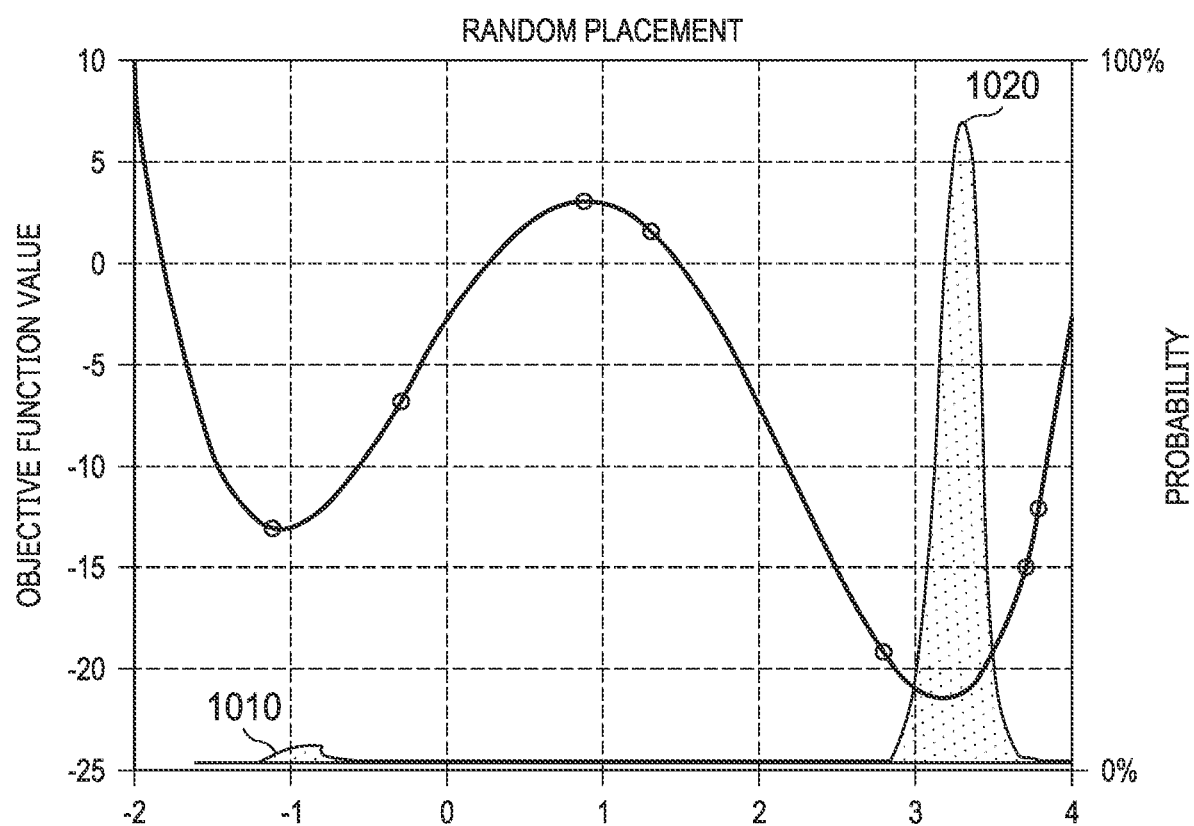
FIG. 10 shows a grid demonstrating a small probability associated with the local minimum outcome illustrated in FIG. 9B compared to the large probability associated with the global minimum outcome illustrated in FIG. 9A.

FIG. 10 shows a grid demonstrating a small probability 1010 associated with the local minimum outcome illustrated of in FIG. 9B compared to the large probability 1020 associated with the global minimum outcome illustrated in FIG. 9A. Thus, the system is stochastic in both the adaptive placement of random independent variables over iterations as well as in the application of Monte Carlo analysis.

Figure 11:
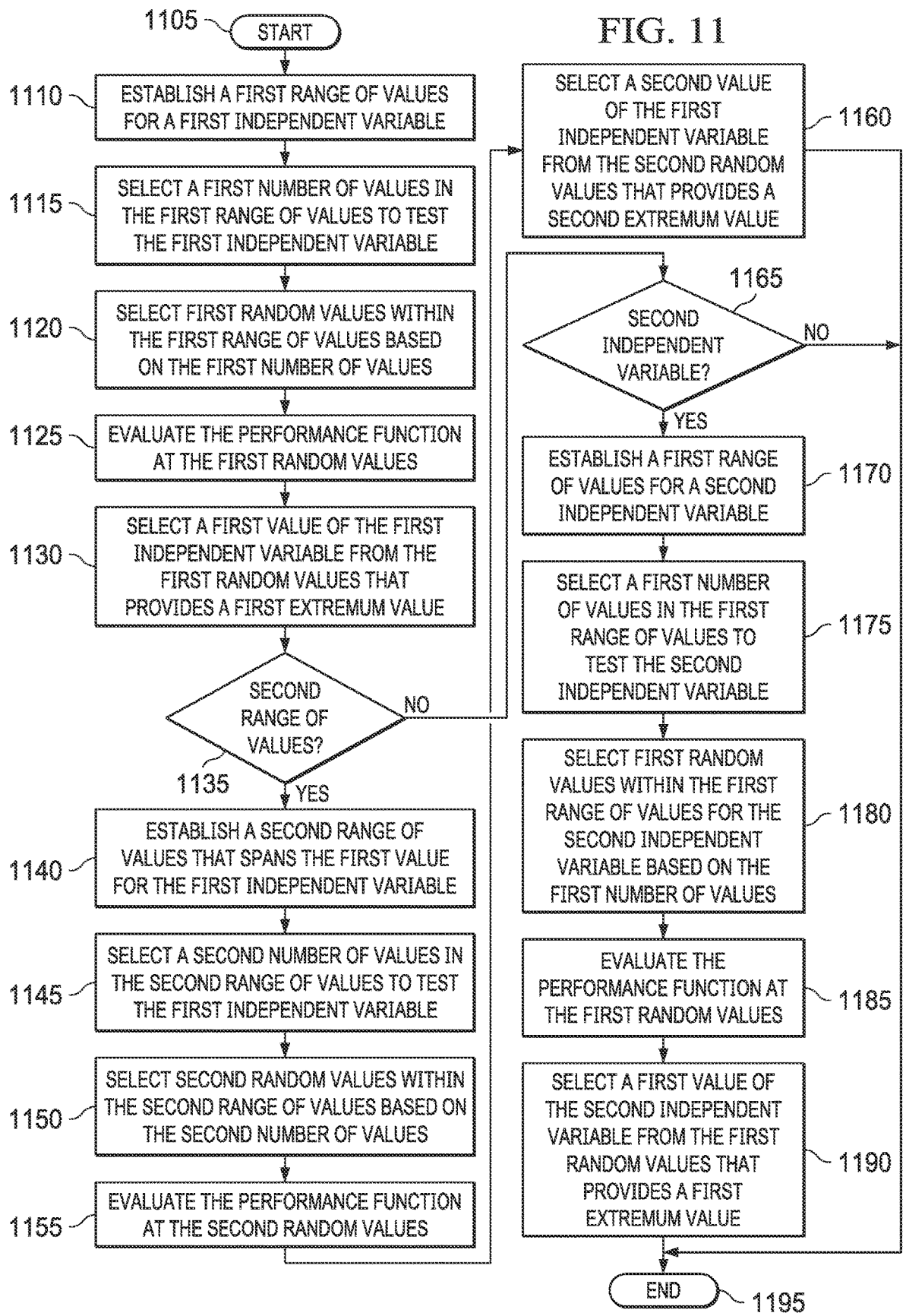
FIG. 11 illustrates a flow diagram of an embodiment of a method of selecting a value for an independent variable that determines an operating state of a system described by a performance function.

Turning now to FIG. 11, illustrated is a flow diagram of an embodiment of a method 1100 of selecting a value (e.g., a first value) for an independent variable (e.g., a first independent variable) that determines an operating state of a system described by a performance function. The method 1100 may be performed on an apparatus as set forth below with respect FIG. 12. The method 1100 begins at a start step or module 1105, and then establishes a first range of values for the first independent variable at a start step or module 1110. At a step or module 1115, the method 1100 selects a first number of values in the first range of values to test the first independent variable, and then selects first random values within the first range of values for the first independent variable based on the first number of values at a start step or module 1120.

At a step or module 1125, the method 1100 evaluates the performance function at the first random values and then selects the first value of the first independent variable from the first random values that provides a first extremum value (e.g., a minimum or maximum value) for the performance function at a start step or module 1130. The performance function may include a plurality of extrema. The performance function may be a discontinuous function, a nonlinear function or a nonconvex function of the first independent variable. The performance function may accommodate a system constraint by including a Lagrange multiplier.

At a decisional step or module 1135, the method 1100 determines if a second range of values that spans the first value for the first independent variable is to be established. If the answer is yes and at a step or module 1140, the method 1100 establishes a second range of values that spans the first value for the first independent variable, and then selects a second number of values in the second range of values to test the first independent variable at a step or module 1145. At a step or module 1150, the method 1100 selects second random values within the second range of values for the first independent variable based on the second number of values, and then evaluates the performance function at the second random values at a step or module 1155. At a step or module 1160, the method 1100 selects a second value of the first independent variable from the second random values that provides a second extremum value for the performance function. If the answer is no to the decisional step or module 1135 or following the step of module 1160, the method 1100 proceeds to decisional step or module 1165.

At the decisional step or module 1165, the method 1100 determines if a second independent variable is to be evaluated. If the answer is yes, the method 100 proceeds to a step or module 1170, otherwise the method 1100 ends at an end step or module 1195. At the step or module 1170, the method 1100 establishes a first range of values for a second independent variable, and then selects a first number of values in the first range of values to test the second independent variable at a step or module 1175. At a step or module 1180, the method 1100 selects first random values within the first range of values for the second independent variable based on the first number of values. At a step or module 1185, the method 1100 evaluates the performance function at the first random values, and then selects a first value of the second independent variable from the first random values that provides a first extremum value for the performance function at a step or module 1190. The method 1100 ends at the end step or module 1195.

Figure 12:
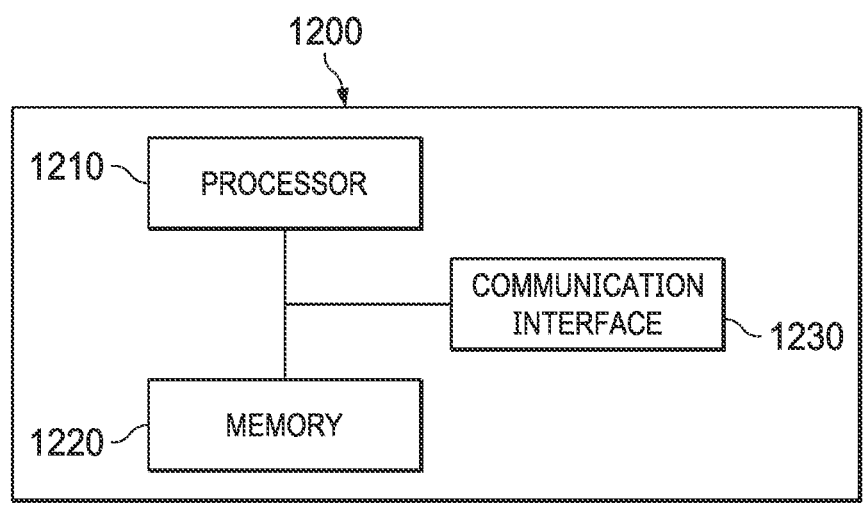
FIG. 12 illustrates a block diagram of an embodiment of an apparatus for performing the operations as set forth herein.

Turning now to FIG. 12, illustrated is a block diagram of an embodiment of an apparatus 1200 for performing the operations as set forth herein. The apparatus 1200 is configured to perform functions described hereinabove of determining a value for an independent variable that determines an operating state of a system described by a performance function. The apparatus 1200 includes a processor (or processing circuitry) 1210, a memory 1220 and a communication interface 1230 such as a graphical user interface.

The functionality of the apparatus 1200 may be provided by the processor 1210 executing instructions stored on a computer-readable medium, such as the memory 1220 shown in FIG. 12. Alternative embodiments of the apparatus 1200 may include additional components (such as the interfaces, devices and circuits) beyond those shown in FIG. 12 that may be responsible for providing certain aspects of the device's functionality, including any of the functionality to support the solution described herein.

The processor 1210 (or processors), which may be implemented with one or a plurality of processing devices, perform functions associated with its operation including, without limitation, performing the operations of estimating the state of a system, computing covariance matrices, and estimating a future state of the system. The processor 1210 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The processor 1210 may include, without limitation, application processing circuitry. In some embodiments, the application processing circuitry may be on separate chipsets. In alternative embodiments, part or all of the application processing circuitry may be combined into one chipset, and other application circuitry may be on a separate chipset. In still alternative embodiments, part or all of the application processing circuitry may be on the same chipset, and other application processing circuitry may be on a separate chipset. In yet other alternative embodiments, part or all of the application processing circuitry may be combined in the same chipset.

The memory 1220 (or memories) may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memory 1220 may include program instructions or computer program code that, when executed by an associated processor, enable the respective device 1200 to perform its intended tasks. Of course, the memory 1220 may form a data buffer for data transmitted to and from the same. Exemplary embodiments of the system, subsystems, and modules as described herein may be implemented, at least in part, by computer software executable by the processor 1210, or by hardware, or by combinations thereof.

The communication interface 1230 modulates information for transmission by the respective device 1200 to another device. The respective communication interface 1230 is also configured to receive information from another processor for further processing. The communication interface 1230 can support duplex operation for the respective other processor 1200.

As described above, the exemplary embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a processor. In particular, in the case of firmware or software, the exemplary embodiments can be provided as a computer program product including a computer readable storage medium embodying computer program code (i.e., software or firmware) thereon for execution by the computer processor. The computer readable storage medium may be non-transitory (e.g., magnetic disks; optical disks; read only memory; flash memory devices; phase-change memory) or transitory (e.g., electrical, optical, acoustical or other forms of propagated signals-such as carrier waves, infrared signals, digital signals, etc.). The coupling of a processor and other components is typically through one or more busses or bridges (also termed bus controllers). The storage device and signals carrying digital traffic respectively represent one or more non-transitory or transitory computer readable storage medium. Thus, the storage device of a given electronic device typically stores code and/or data for execution on the set of one or more processors of that electronic device such as a controller.

Since the system is gradient-free, the system is numerically stable. Because gradients are not part of the system, there is no need to compute derivatives. The independence from derivatives means the system allows for the inclusion of other architectural entities, logic gates being one such entity. Logic gates form the basis of artificial decision-making allowing optimization of reasoning and preference selection. Another such entity is the Qbit gate. Qbit gates are the fundamental building blocks of quantum computing. By allowing their inclusion, the system facilitates quantum computing research with applications to quantum cryptography for just one example.

By embracing the benefits of grid search and random search, there is no need for a priori information to start the system with a known set of coordinates. Generating random variables across the grid provides the set of initial coordinates. Also, the curse of dimensionality associated with grid search alone is avoided because only random coordinates are evaluated instead of every coordinate possible. Furthermore, these coordinates are adaptively updated, resulting in a more precise search. Thus, the precision of the search is controlled by the resolution. This enables initial approximate solutions quickly.

There is no need to follow any architectural philosophy for algorithm choice and parameter selection, including independent variables for nonconvex methods. The system is designed to solve the most general optimization problem including nonconvex objective functions with linear and/or nonlinear, equality and/or inequality constraints, with real and/or integer values. Moreover, stochastic input variables can be any type of probability distribution.

With the addition of Monte Carlo methods, multiple iterations increase confidence in locating the global extrema, which supports verification and validation of trustable artificial intelligence. Most methods aim for finding only the global extremum, perhaps to a fault. By making a plurality of outcomes available through Monte Carlo methods, sub-optimal performance may be acceptable due to cost effectiveness. Additionally, there may be a plurality of systems where some individual systems may operate at suboptimal performance, but the ensemble is more cost effective. The previously mentioned highlighted application examples are instructive and not meant to be completely exhaustive.

In short, the advantages are a gradient-free, numerically stable, that allows for the inclusion of gates. There is no need for a priori information to start the system with a known set of coordinates. The system configuration can be established to have control over the precision of the search by selecting the resolution. There is no need to follow any prescribed architectural philosophy. The system is designed to solve the most-general optimization problem. Some embodiments of the system may be applied to the prevalent problems of operations research and management sciences including game theory, decision analysis, queueing theory, inventory theory, transportation, and networking. Other embodiments of the system may be applied to supervised (regression and classification) unsupervised (clustering) machine learning architectures.

The ability to handle probabilistic inputs, coupled with the inclusion of logic gate architecture, facilitates another embodiment of the system applied to quantum computing, e.g., quantum Fourier series and quantum cryptography. Real-time system embodiments offer many advantages. Of course, real-time requirements for guidance, navigation, and control processes is different than real-time requirements for e-commerce transactions. In either case, the system may be augmented such that known constraints (if any) could be built into the objective function. Also, by applying an appropriate resolution, the system may be configured to execute in a deterministic time frame.

This single approach for multifunctional systems may be used for industrial applications. These multifunctional systems manage diverse objectives, multiple resources, and numerous constraints. A factory might use several types of power (pneumatic, electrical, hydraulic), several types of labor skills, many different raw materials, all while making multiple products. A production optimization system based on the Industrial Internet of Things (IIoT) can collect data from thousands of sensors. A system with the computational efficiency to support real-time monitoring and control is a valuable advance in optimization. These embodiments are intended to be illustrative, rather than exhaustive.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A method for adaptively optimizing a performance function for a system, comprising:
    selecting a first independent variable that determines an operating state of said system described by said performance function being discontinuous, nonlinear and nonconvex;
    establishing a first range of values for said first independent variable from data from at one sensor coupled to said system;
    selecting a first random set of values within said first range of values for said first independent variable;
    evaluating said performance function with said first random set of values for said first independent variable using logic gates to provide a plurality of first extrema results for said performance function;
    optimizing said performance function by selecting a first value for said first independent variable from said first set of random values that provides a first extremum result from said plurality of first extrema results to produce an optimized performance function; and
    utilizing said optimized performance function to control said system in response to real-time data from said at least one sensor.

2. The method as recited in claim 1, further comprising:
    establishing a second range of values that spans said first value from said first set of random values for said first independent variable from said data from said at least one sensor;
    selecting a second random set of values within said second range of values for said first independent variable;
    evaluating said performance function with said second random set of values for said first independent variable using said logic gates to provide a plurality of second extrema results for said performance function;
    optimizing said performance function by selecting a second value for said first independent variable from said second set of random values that provides a second extremum result from said plurality of second extrema results to produce said optimized performance function; and
    utilizing said optimized performance function to control said system in response to said real-time data from said at least one sensor.

3. The method as recited in claim 1, further comprising:
    establishing a second range of values for a second independent variable from said data from said at least one sensor;

selecting a second random set of values within said second range of values for said second independent variable;

evaluating said performance function with said second random set of values for said second independent variable using said logic gates to provide a plurality of second extrema results for said performance function;

optimizing said performance function by selecting a second value for said second independent variable from said second set of random values that provides a second extremum result from said plurality of second extrema results to produce said optimized performance function; and utilizing said optimized performance function to control said system in response to said real-time data from said at least one sensor.

4. The method as recited in claim 1, wherein said evaluating comprises iteratively evaluating said performance function with said first set of random values for said first independent variable using said logic gates to provide said plurality of first extrema results for said performance function and said optimizing comprises selecting said first value for said first independent variable from said first set of random values that provides said first extremum result from said plurality of first extrema results to produce said optimized performance function.

5. The method as recited in claim 1, wherein said first extremum result is a maximum extremum result or a minimum extremum result.

6. The method as recited in claim 1, wherein said performance function is gradient-free.

7. The method as recited in claim 1, wherein said first range of values imposes a lower bound and an upper bound on said first independent variable.

8. The method as recited in claim 7, wherein said first range of values is computed by dividing a difference between said lower bound and said upper bound by a resolution of said plurality of first extrema results.

9. The method as recited in claim 1, wherein said performance function accommodates a system constraint by including a Lagrange multiplier.

10. The method as recited in claim 1, wherein said utilizing comprises controlling at least one of aircraft, spacecraft, speed of milling machines, and automated bidding systems.

11. An apparatus operable to adaptively optimize a performance function for a system, comprising:

processing circuitry including logic gates coupled to a memory, configured to:

select a first independent variable that determines an operating state of said system described by said performance function being discontinuous, nonlinear and nonconvex;

establish a first range of values for said first independent variable from data from at one sensor coupled to said system;

select a first random set of values within said first range of values for said first independent variable;

evaluate said performance function with said first random set of values for said first independent variable using said logic gates to provide a plurality of first extrema results for said performance function;

optimize said performance function by selecting a first value for said first independent variable from said first set of random values that provides a first extremum result from said plurality of first extrema results to produce an optimized performance function; and utilize said optimized performance function to control said system in response to real-time data from said at least one sensor.

12. The apparatus as recited in claim 11, wherein said processing circuitry including said logic gates coupled to said memory, is configured to:

establish a second range of values that spans said first value from said first set of random values for said first independent variable from said data from said at least one sensor;

select a second random set of values within said second range of values for said first independent variable;

evaluate said performance function with said second random set of values for said first independent variable using said logic gates to provide a plurality of second extrema results for said performance function;

optimize said performance function by selecting a second value for said first independent variable from said second set of random values that provides a second extremum result from said plurality of second extrema results to produce said optimized performance function; and utilize said optimized performance function to control said system in response to said real-time data from said at least one sensor.

13. The apparatus as recited in claim 11, wherein said processing circuitry including said logic gates coupled to said memory, is configured to:

establish a second range of values for a second independent variable from said data from said at least one sensor;

select a second random set of values within said second range of values for said second independent variable;

evaluate said performance function with said second random set of values for said second independent variable using said logic gates to provide a plurality of second extrema results for said performance function;

optimize said performance function by selecting a second value for said second independent variable from said second set of random values that provides a second extremum result from said plurality of second extrema results to produce said optimized performance function; and utilize said optimized performance function to control said system in response to said real-time data from said at least one sensor.

14. The apparatus as recited in claim 11, wherein said processing circuitry including said logic gates coupled to said memory is configured to iteratively evaluate said performance function with said first set of random values for said first independent variable using said logic gates to provide said plurality of first extrema results for said performance function and optimize said performance function by selecting said first value for said first independent variable from said first set of random values that provides said first extremum result from said plurality of first extrema results to produce said optimized performance function.

15. The apparatus as recited in claim 11, wherein said first extremum result is a maximum extremum result or a minimum extremum result.

16. The apparatus as recited in claim 11, wherein said performance function is gradient-free.

17. The apparatus as recited in claim 11, wherein said first range of values imposes a lower bound and an upper bound on said first independent variable.

18. The apparatus as recited in claim 17, wherein said first range of values is computed by dividing a difference between said lower bound and said upper bound by a resolution of said plurality of first extrema results.

19. The apparatus as recited in claim 11, wherein said performance function accommodates a system constraint by including a Lagrange multiplier.

20. The apparatus as recited in claim 11, wherein said processing circuitry including said logic gates coupled to said memory is configured to control at least one of aircraft, spacecraft, speed of milling machines, and automated bidding systems.

* * * * *

UNITED STATES PATENT AND TRADEMARK OFFICE
CERTIFICATE OF CORRECTION

PATENT NO. : 12,430,539 B2  
APPLICATION NO. : 18/050661  
DATED : September 30, 2025  
INVENTOR(S) : Randal Allen It is certified that error appears in the above-identified patent and that said Letters Patent is hereby corrected as shown below:

In the Claims

Claim 1, Line 8 (Column 12, Line 27), replace "at one sensor" with "at least one sensor".
Claim 1, Lines 17-18 (Column 12, Lines 36-37), replace "first set of random values" with "first random set of values".
Claim 2, Line 3 (Column 12, Line 45), replace "first set of random values" with "first random set of values".
Claim 2, Line 15 (Column 12, Line 57), replace "second set of random values" with "second random set of values".
Claim 3, Line 14 (Column 13, Line 10), replace "second set of random values" with "second random set of values".
Claim 4, Line 3 (Column 13, Line 20), replace "first set of random values" with "first random set of values".
Claim 4, Lines 7-8 (Column 13, Lines 24-25), replace "first set of random values" with "first random set of values".
Claim 11, Line 10 (Column 13, Line 57), replace "at one sensor" with "at least one sensor".
Claim 11, Line 20 (Column 13, Line 67), replace "first set of random values" with "first random set of values".
Claim 12, Line 5 (Column 14, Line 11), replace "first set of random values" with "first random set of values".
Claim 12, Line 16 (Column 14, Line 23), replace "second set of random values" with "second random set of values".
Claim 13, Line 15 (Column 14, Line 45), replace "second set of random values" with "second random set of values".
Claim 14, Line 4 (Column 14, Line 55), replace "first set of random values" with "first random set of values".
Claim 14, Line 9 (Column 14, Line 60), replace "first set of random values" with "first random set of values".

Signed and Sealed this  
Twenty-fifth Day of November, 2025

John A. Squires  
*Director of the United States Patent and Trademark Office*